US008845874B2

(12) United States Patent
Lee (10) Patent No.: US 8,845,874 B2
(45) Date of Patent: Sep. 30, 2014

(54) POROUS ELECTROFORMED SHELL FOR PATTERNING AND MANUFACTURING METHOD THEREOF

(75) Inventor: Kyung-Ho Lee, Seoul (KR)

(73) Assignee: Moltex Co., Ltd., Anseong, Gyeonggi-Do (KR)

( * ) Notice: Subject to any disclaimer, the term of this patent is extended or adjusted under 35 U.S.C. 154(b) by 655 days.

(21) Appl. No.: 12/845,028

(22) Filed: Jul. 28, 2010

(65) Prior Publication Data

US 2011/0056837 A1   Mar. 10, 2011

(30) Foreign Application Priority Data

Sep. 10, 2009  (KR) .................. 10-2009-0085210

(51) Int. Cl.
C25D 1/08     (2006.01)
C25D 1/10     (2006.01)
B29C 33/38    (2006.01)
C25D 5/02     (2006.01)
B29C 51/36    (2006.01)
B29L 31/00    (2006.01)

(52) U.S. Cl.
CPC .............. *C25D 1/08* (2013.01); *B29C 33/3814* (2013.01); *B29L 2031/757* (2013.01); *B29C 2791/006* (2013.01); *B29K 2863/00* (2013.01); *C25D 1/10* (2013.01); *C25D 5/022* (2013.01); *B29C 51/365* (2013.01)
USPC .............................................. 205/75; 205/67

(58) Field of Classification Search
USPC ............................................. 205/67, 75, 83
See application file for complete search history.

(56) References Cited

U.S. PATENT DOCUMENTS 3,963,587 A * 6/1976 Kreckel ......................... 205/73
4,964,965 A * 10/1990 Nakatsugawa ................ 204/280
5,728,284 A * 3/1998 Oyama ........................... 205/70

FOREIGN PATENT DOCUMENTS

JP   59-140385   * 8/1984  ............... C25D 1/10
JP   07-173667   * 7/1995  ............... C25D 1/00

OTHER PUBLICATIONS

Lowenheim, F.A., "Electroplating," McGraw-Hill, 1978, p. 12-13.*
Translated JP document: Kurihara, T. et al. "Manufacturing method of vacuum mold" PN 59-140385, AN 58-11260, Aug. 11, 1984.*

* cited by examiner

*Primary Examiner* — Keith Hendricks
*Assistant Examiner* — Stefanie S Wittenberg
(74) *Attorney, Agent, or Firm* — Galgano & Associates, PLLC; Thomas M. Galgano; Jessica G. Bower (57) ABSTRACT

Disclosed are a porous electroformed shell for forming a grain pattern and a manufacturing method thereof. The method includes the step of implanting a fiber into a patterned surface of a negative-type silicone cast; applying, laminating, and curing an epoxy resin on the patterned surface of the negative-type silicone cast, and transferring the fiber from the negative-type silicone cast to an epoxy mandrel during demolding of the epoxy mandrel; forming a conductive thin film on the patterned surface of the epoxy mandrel, and causing the patterned surface to be conductive; removing the fiber having the conductive thin film from a surface of the epoxy mandrel; forming an electrodeposited layer by electrodepositing an electroforming metal on the conductive thin film while generating and growing a fine pore at a position of a hole due to the removal of the fiber; and demolding the electrodeposited layer having the fine pore from the epoxy mandrel. Through the disclosed method, precise control on a diameter and distribution of a fine pore can be simply and efficiently can be carried out.

8 Claims, 10 Drawing Sheets

POROUS ELECTROFORMED SHELL FOR PATTERNING AND MANUFACTURING METHOD THEREOF

BACKGROUND OF THE INVENTION

1. Field of the Invention

The present invention relates to a porous electroformed shell for patterning and a manufacturing method thereof, and more particularly to a porous electroformed shell for patterning and a manufacturing method thereof, allowing to economically and effectively manufacture a surface skin material or injection molded product with refined texture, which is employed in one-piece molding of a high-quality surface skin material for providing a curved surface of a specific three-dimensional cubic synthetic resin product with refined texture through various patterns of desired shapes and thereby enhancing an emotional quality.

In the manufacturing method of a porous electroformed shell for patterning, according to the present invention, the overall or local formation positions, shapes, densities, and diameters of pores can be simply, economically, efficiently and precisely controlled according to various curved shapes of the electroformed shell by forming pores at the electroformed shell by means of a fiber.

2. Description of the Prior Art

With the improvement of the standard of living, and the industrial development, consumers have recently shown a tendency of gradually considering, as an important purchasing criteria, sensitive qualities (such as colors or textures) shown in a product's appearance as well as the product's own functions.

In accordance with such a tendency, a plastic molding technology and an apparatus thereof have recently been advanced day-by-day. Also, as a cost reduction and a high value addition are required in a vehicle manufacturing field and an information technology (IT) field, various in-mold forming methods and a multicomponents coinjection method have been suggested, and their application ranges have been rapidly expanded.

The in-mold forming method indicates a kind of forming method in which within one mold, various technologies, such as labeling, lamination, painting, coating, welding, surface protection, decoration, assembly, transfer printing, laser cutting, plasma processing, spray activation, or micro-structuring, are applied while a product is molded. Also, the in-mold forming method may be divided into in-mold lamination (IML), in-mold decoration (IMD), in-mold coating (IMC), in-mold transcription (IMT), and the like, according to the kinds of applied techniques.

Meanwhile, in the multicomponents coinjection method, a molded article is manufactured by combining different kinds or colors of polymer molding materials with each other and by using one or more molding machines and a specific molding system through a single process. The method representatively includes sandwich molding, over-molding, or the like. The two highly-functional and highly-efficient injection molding methods as described above are not independent from each other. In actuality, in many cases, the two methods are mutually overlappingly employed.

One-piece molding of a high-quality surface skin material is applied to various articles, such as an instrument panel or board, a glove box, a console, a lower cover, a pillar, a door's internal panel, an airbag cover panel, or the like. Also, examples of the method may include: an in-mold injection compression forming method, in which a thermoplastic polyolefin (TPO) film (about 0.7 mm) and a foamed layer (about 3.0 mm) as skin materials of a surface decorative layer for providing grain patterns and soft feeling, and a polypropylene composite as a substrate are used, the preformed TPO skin layer is mounted within a mold by a robot, and foaming and pattern-decorating processes and a molding process are simultaneously carried out as a single process; an in-mold trimming lamination method, in which a skin material after being laser-cut is trimmed within a mold, thereby omitting a post-process trimming process; a post-process-unwanted hybridizing method in which injection molding of thermoplastic resin, and reaction molding of polyurethane are applied to a sheet trim of a premium automobile so as to provide an excellent soft touch effect and a high scratch resistance and a high UV resistance; a carpet surface decoration integral molding method, in which for an interior material of a carpet skin material, a carpet laminate is preformed and compression-molded as a single process, without a preforming process of the carpet skin material, thereby reducing the number of processes; and a multi-stage clamping control injection compression molding method, in which in a case where a skin material is a foam material, the skin material is placed within a mold by opening the mold, and is subjected to low pressure molding, and then the mold is compressed and re-opened to restore the skin material's thickness to be close to its original thickness.

Herein, in in-mold forming employing a skin material having a specific cubic pattern, for example, a natural or artificial leather grain pattern, since the skin material has an influence on an emotional quality, it has become an important issue to provide a predetermined cubic pattern to the skin material, and preform it into a predetermined three-dimensional shape. Examples of such a preforming method may include a positive type (male type) vacuum forming method, a negative type (female type) vacuum forming method, a polyurethane spray method, and a slush molding method.

Figure 9:
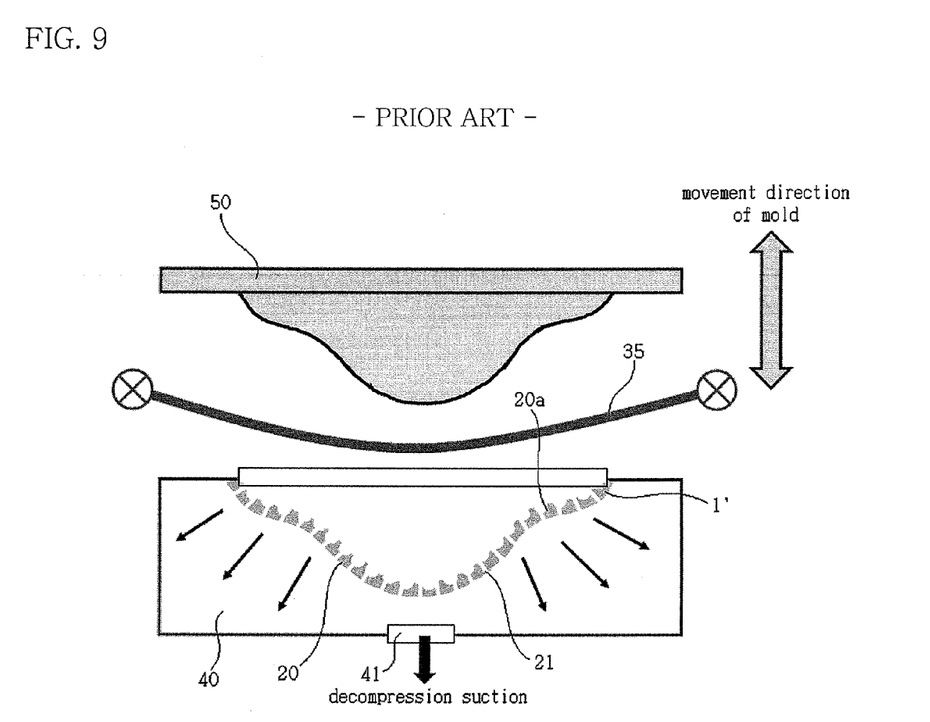
FIG. 9 is a mimetic diagram illustrating a conventional general negative type vacuum molding method.

FIG. 9 is a mimetic diagram illustrating a conventional general negative type vacuum forming method for preforming a skin material as a decorative layer. In the method, a porous electroformed shell 1' which includes an electrodeposited layer 20 having a grain patterned surface 20a and multiple fine pores 21 formed therein is mounted on a lower mold 40 having a decompression suction hole 41 in the center thereof. Then, a smoothened thermoplastic polyolefin (TPO) sheet 35 not formed with a grain pattern is softened through preheating, comes in contact with the porous electroformed shell 1', and is decompression-sucked while pressed by an upper mold 50. As a result, a grain pattern is provided to the sheet and at the same time, the sheet is pre-shaped.

Accordingly, since the above described negative type vacuum forming method generally employs the porous electroformed shell 1', there is an advantage in that the expression precision of grains (sharpness of a grain outline) is high, local disappearance of grains hardly occurs, deformation of grains is minimized, positions and directions of grains are regular, and productivity and economical efficiency are high. Thus, the method has been widely applied to the manufacturing of a skin material having a decorative layer.

Since in an in-mold forming method employing a skin material with a specific cubic pattern, for example, a grain pattern, the above mentioned negative type vacuum forming method may be applied. Hereinafter, a conventional manufacturing method for the porous electroformed shell 1' to be applied to pre-forming of the skin material, especially, a porous nickel electroformed shell, the porous electroformed shell 1', and a forming method of the skin material, will be described.

Japanese Patent Laid-Open HEI 05-156486 (laid open on 1993 Jun. 22) discloses a method for manufacturing a porous electroformed mold, in which holes are formed on a silver mirror conductive film of a mandrel surface. In this method, since a burr is formed at a front side of the shell owing to the hole processing during demolding of the electroformed mold, there is a problem in that an additional process for removing the burr is demanded.

Japanese Patent Laid-Open HEI 02-225687 (laid open on 1990 Sep. 7) discloses a method for manufacturing a breathable porous electroformed mold, which includes the steps of: electrostatic planting a short fiber on a silver mirror conductive film of a mandrel surface; forming a first electroformed layer in which the base of the short fiber is buried; layering a second electroformed layer for generating and growing a through hole from the leading end of the short fiber; peeling the first and second electroformed layers from the mandrel; and removing the short fiber. This method requires an additional electrostatic file planting apparatus, two-step electroforming processes controlled according to the length of a short fiber, and a short fiber removing process by combustion and/or solvent dissolution, and thus has a low productivity and a low economical efficiency.

Also, Japanese Patent Laid-Open HEI 6-25885 (laid open on 1994 Feb. 1) discloses a porous electroforming mold and a manufacturing method thereof. In the method, a first electroformed layer having multiple first through holes is formed on an electroformed mask having discharge holes, a combustible first mesh member is attached thereto, and a second electroformed layer having second through holes communicating with the first through holes is formed thereon while supplying nitrogen gas to the first through holes by a gas supply apparatus. Then, after this process is carried out at least once, the electroformed mask is detached, and the first mesh member is heated and removed, thereby forming mesh-shaped through holes mutually communicating with the multiple through holes in a transverse direction. This method also has a disadvantage in that the productivity and the economical efficiency are low due to complicated processes, and it is not related to local control on the density of through holes in the electroformed shell.

Also, Japanese Patent Laid-Open HEI 9-249987 (laid open on 1997 Sep. 22) discloses a method for manufacturing a porous electroformed frame, in which an electroformed frame surface layer with no hole is electroformed; a fine straight hole having a narrow and predetermined diameter is formed by laser, electron beam, ion beam, electric discharge, or drilling; and an enlarged-diametric hole from the end of the fine straight hole is extended by electroforming so that the hole diameter cannot be enlarged even by a long-time surface friction. This method has an advantage in that it is theoretically possible to control the diameter of the fine straight hole and the whole/local density, but has a disadvantage in that physical processing of multiple fine straight holes is very complicated, uneconomic, and time consuming, thus is in actuality, not efficient at all.

SUMMARY OF THE INVENTION

Accordingly, the present invention has been made to solve the above-mentioned problems occurring in the prior art, and a first object of the present invention is to provide a porous electroformed shell for patterning and a manufacturing method thereof, in which diameters, formation positions, and densities of fine pores formed on a three-dimensional electroformed shell, both as a whole or in part, can be simply, economically, efficiently, and precisely controlled according to various curved shapes of the electroformed shell.

Besides the first object, a second object of the present invention is to provide a method for economically and effectively manufacturing a patterning porous electroformed shell so as to effectively express refined, sharp, and precise texture on the surface of an injection molded product.

A third object of the present invention is to provide a patterning porous electroformed shell manufactured by the manufacturing method according to the first and second objects, especially, a patterning porous nickel electroformed shell.

In accordance with an aspect of the present invention, there is provided a method for manufacturing a porous electroformed shell for patterning, the method including: a fiber implanting step of implanting a fiber into a patterned surface of a negative-type silicone cast; an epoxy mandrel manufacturing step of applying, laminating, and curing an epoxy resin on the patterned surface of the negative-type silicone cast, and transferring the fiber from the negative-type silicone cast to an epoxy mandrel during demolding of the epoxy mandrel; a conductive thin film forming step of forming a conductive thin film on the patterned surface of the epoxy mandrel, and causing the patterned surface to be conductive; a fiber removing step of removing the fiber having the conductive thin film from a surface of the epoxy mandrel; an electroforming step of forming an electrodeposited layer by electrodepositing an electroforming metal on the conductive thin film while generating and growing a fine pore at a position of a hole due to the removal of the fiber; and a porous electroformed shell demolding step of demolding the electrodeposited layer having the fine pore from the epoxy mandrel.

Preferably, an entire length of the fiber implanted into the patterned surface of a negative-type silicone cast may be 5-15 mm.

Preferably, the fiber, which is transferred from negative-type silicone cast to the epoxy mandrel, may be implanted into the epoxy mandrel to the depth of 2-4 mm.

Preferably, a diameter of the fiber may be 0.05 mm-0.30 mm.

Preferably, in the electroforming step, a blocking wall having a height greater than an uppermost height of the epoxy mandrel by 20~30 mm, and multiple pores formed therein may be placed in a box form at front/rear/left/right sides and an upper side of the epoxy mandrel, so as to prevent bubbles from detaching by a flow velocity of an electroforming liquid.

Preferably, in the electroforming step, the epoxy mandrel is immersed in a plating solution and then, it is electroformed after 1-2 hours so as to enhance an adhesion between the epoxy mandrel having the conductive thin film and the plating solution.

Preferably, in the electroforming step, initially it is electrodeposited in a current from 0.5 to 0.8 A/dm$^2$ for 2-5 hours and then, it increases in a current from 0.05 to 0.2 A/dm$^2$ per 10 minutes to reach 1.2 to 2.5 A/dm$^2$, and then, it is continuously electrodeposited for 5-10 days, or it continuously maintains 1.2 to 2.5 A/dm$^2$ during 5-10 days from the beginning.

Preferably, the electrodeposited layer may be made of nickel, copper, or brass.

Preferably, a release treatment step is carried out before the fiber is implanted into the patterned surface of the negative-type silicone cast.

Preferably, the porous electroformed shell has a plurality of fine pores and at least 95% of the fine pores have front-side opening diameters within a range of ±0.02 mm error of hole diameters formed by the fiber.

In the manufacturing method of a patterning porous electroformed shell, according to the present invention, a fiber is transferred to be conductive and then, it is removed to be electroformed, so that both as a whole or in part, diameters, formation positions, and densities of fine pores can be simply, economically, efficiently, and precisely controlled according to various curved shapes of the electroformed shell. Accordingly, in forming the surface of a high-quality surface skin material that is, skin sheet or film or a plastic molded product with a predetermined pattern, when the fine pore is used as a decompression suction hole or an air vent, a predetermined pattern can be efficiently and economically obtained in such a manner that it has a regular position, a regular directionality, sharp radii, and minimized deformation.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

In the present specification, the term "pattern" is widely defined by not only a specific surface shape, but also other shapes recalling any repetitive or specific unindicative idea. Especially, the term "grain pattern" is defined by any pattern realized on the outer surface of natural or artificial leather.

Also, the term "shell" denotes a skin-type mold having a three dimensional shaped curve and a protrusion, and sometimes its meaning includes a plate-type two dimensional shape.

Also, the term "porous electroformed shell for patterning" is widely defined by not only a mold for preforming a skin material in a negative type vacuum forming method for manufacturing the skin material used for one-piece molding of a high-quality surface skin material (a kind of in-mold forming method), but also a mold or a screen, used for various forming methods, such as blow molding, stamping molding, injection molding, RIM urethane molding, compression molding, injection compression molding, multi-stage clamping control injection compression molding, various in-mold forming methods, in-mold insert injection molding, resin beads foam molding, and preform molding.

In the present invention, the "fiber" is defined by natural or artificial linear material, which is long and thin, and can be bent softly.

Hereinafter, the present invention will be described in detail with reference to the drawings.

FIGS. 1a to 1i illustrate in sequence a method for manufacturing a porous electroformed shell for patterning, according to the present invention. Hereinafter, this will be described.

Figure 1A:
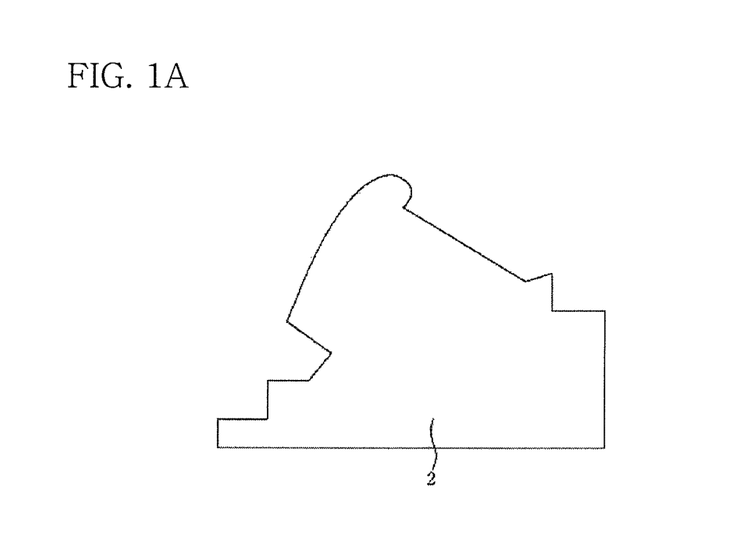
FIGS. 1a to 1i are views illustrating in sequence a method for manufacturing a porous electroformed shell for patterning, according to the present invention.

First, FIG. 1a shows a step of manufacturing a model, in which all data related to a shape and a size of an injection molded product are obtained from a product developing company or a product manufacturing company, the data are analyzed and reviewed, a tool design of the product is carried out, and a model 2 is obtained based on this.

The model 2 is conventionally made of wood, and as required may be made of synthetic resin (such as epoxy, chemical wood, or the like) or other various materials, such as plaster or beeswax. In general, the outer surface of the model 2 is formed as a smooth surface.

The data on the model 2 are modified in such a manner that a precise pattern can be realized in consideration of the shape and size of the product, and size conversion with about 0.1~1.0 mm can be carried out based on experiences and experimental information. Such data modification takes implementation for easy and precise patterning of a molded product, into consideration.

Also, an appropriate thickness is selected so as to provide durability required for the implementation, the product shape is re-designed, and the obtained data are stored. Since the modified data on the re-designed model 2 is directly related to productivity, various reviews are carried out from the stand point of operating directions and angles for mounting and demolding.

Meanwhile, although not shown, in exceptional cases, the model 2 may be made of light metal, such as Fe, Cu or alloys thereof, Al or alloys thereof, Sn or alloys thereof, Ni or alloys thereof. In these cases, the model 2 may be directly patterned without a leather wrapping step shown in FIG. 1b as described below. Herein, the roughness of a finished surface is preferably equal to or greater than #600 based on sand paper so as to form a sharp and precise pattern.

Figure 1B:
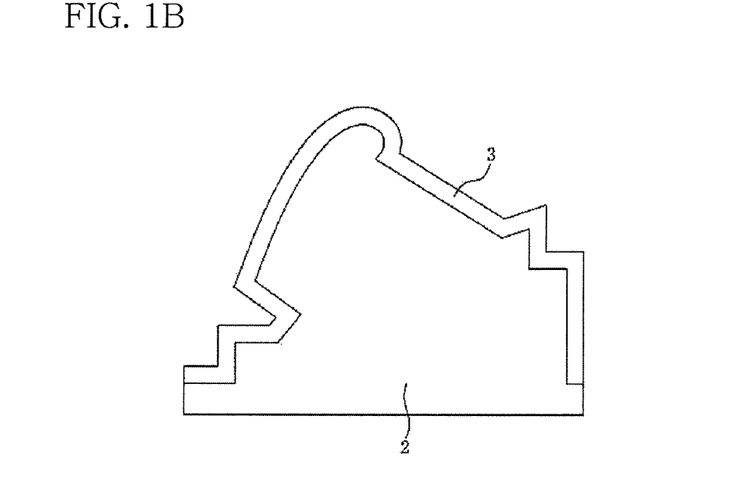

Meanwhile, in a general case where the model 2 is made of wood, synthetic resin, plaster or beeswax, other than a light metal, the leather wrapping step as shown in FIG. 1b is carried out. In this step, the outer surface of the model 2 made of wood, or the like, obtained from the step shown in FIG. 1a, is wrapped with a leather 3 having a to-be-realized pattern, for example, a specific natural or artificial leather grain pattern, and an adhesive state of the leather 3, a pattern direction, a deformation in grains constituting the pattern, a defect of the grains, an extent of the defect, and the like, are checked.

Figure 1C:
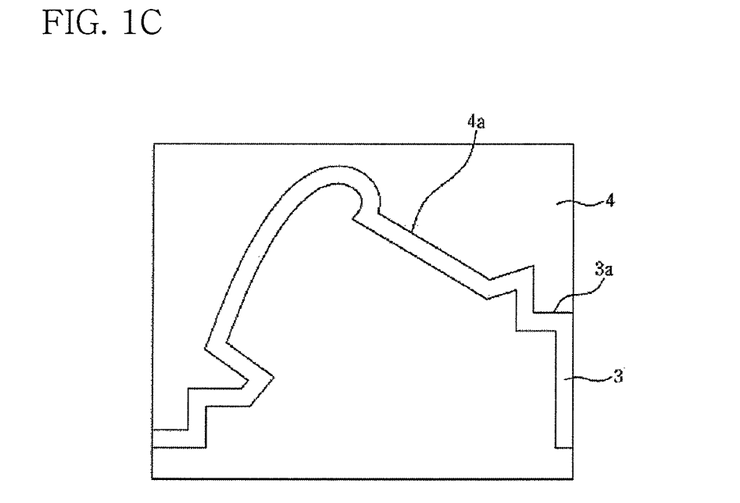

Then, FIG. 1c shows a silicone cast manufacturing step for surface transfer of the wrapped model 2 or the patterned light metal model 2. In this step, a silicone resin is applied to the outer surface formed with the pattern, followed by curing, by which the inner surface of a negative-type silicone cast 4 becomes a patterned surface 4a by a patterned surface 3a of the leather 3 or an etched patterned surface of the light metal model 2.

In general, the silicone resin has a high elasticity, and can be transferred without concern about damage to a formed fine and precise pattern during demolding. The layer of the silicone resin is generally shaped with a predetermined thickness of about 5 to 20 mm, and is cured by settling at room temperature for about 24 to 48 hours.

The resin that may be used in the above described step shown in FIG. 1c is not limited to silicone. There is no limitation in the resin as long as it is a soft material having a similar physical property known in the art to that of silicone.

Figure 1D:
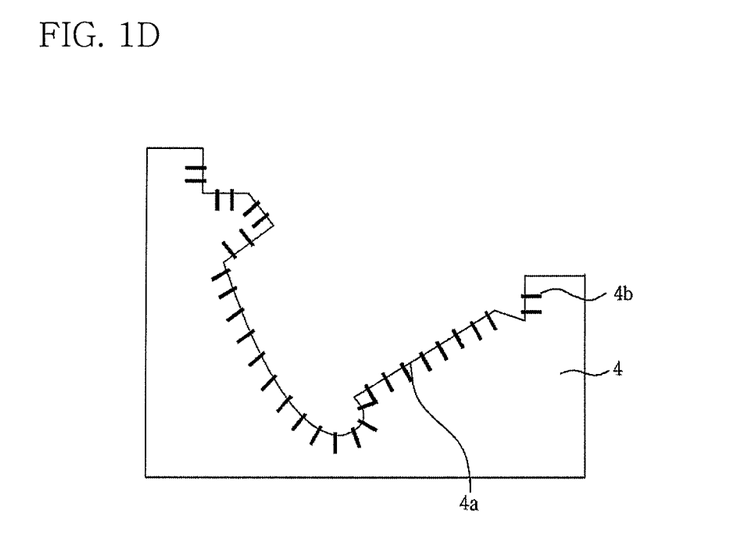

FIG. 1d shows a step of implanting a fiber into a silicone resin. In this step, a plurality of fibers 4b is implanted into the patterned surface 4a of the negative-type silicone cast 4 by using the characteristics of low hardness of the cured silicone resin without forming holes. Here, the entire length of the fiber may be about 5-15 mm. Also, it is preferred that the length of the fiber, which is exposed from the outside of the patterned surface of the negative-type silicone cast, is about 2-4 mm.

In the present invention, the fiber is not limited to any material, as long as it has enough hardness to be implanted into the silicone cast and enough tensile strength not to be cut in the following epoxy mandrel manufacturing step. For example, a carbon fiber, a nylon fiber or a steel wire may be used as the fiber. The diameter of the used fiber can be changed according to the purpose thereof, and in this embodiment of the present invention, it has 0.10-0.30 mm in diameter. Here, an end portion of the fiber can be cut diagonally so as to easily implant the fiber into the negative-type silicone cast. According to quality of the material, a release treatment step, in which release agents are coated on the surface of the fiber and the like, is carried out, so as to easily remove it from the silicone cast or the epoxy mandrel in the following fiber transfer step or the fiber removing step.

Figure 1E:
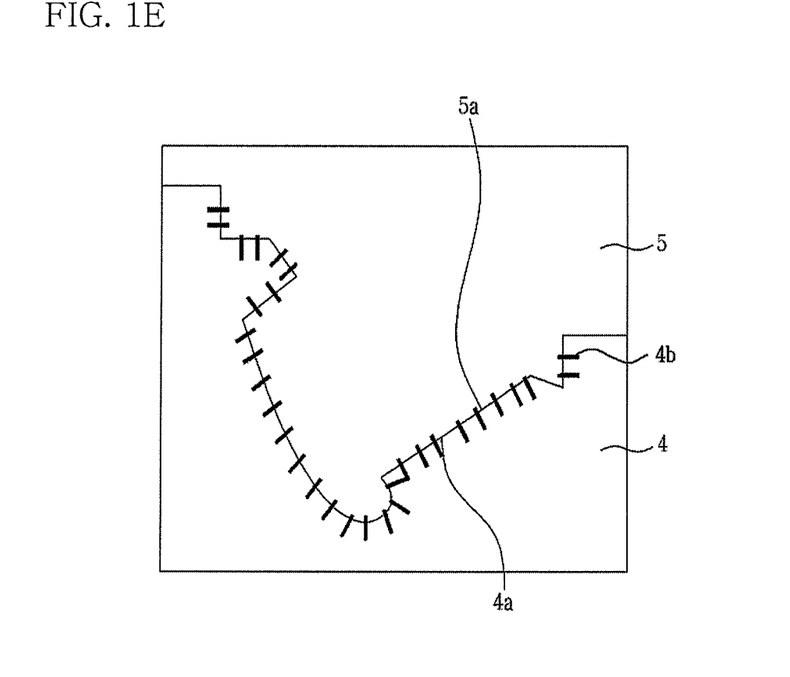

FIG. 1e shows a step of manufacturing an epoxy mandrel 5. In this step, the patterned surface 4a of the negative-type silicone cast 4, into which the plurality of fibers 4b is implanted, is applied and laminated with an epoxy resin to be cured. Here, the fiber 4b, which is implanted into the negative-type silicone cast 4, is transferred to the epoxy mandrel 5 according to the curing of the epoxy mandrel 5. Here, a part of the fiber 4b exposed from the patterned surface 4a of the negative-type silicone cast 4 is transferred to the epoxy mandrel 5 according to the applying, laminating, and curing of to the epoxy resin. As described in FIG. 1d, it is preferred that the length of the fiber, which is transferred to and implanted into the epoxy mandrel 5, is about 2-4 mm. In a case that it is below 2 mm, the fiber can be pulled out during demolding thereof after the fiber is transferred from the silicone cast to the epoxy resin. Also, it is concern that the fiber can be cut in the middle portion thereof when the fiber is removed from the epoxy mandrel, next to a silver mirror reaction step as described below.

Figure 1F:
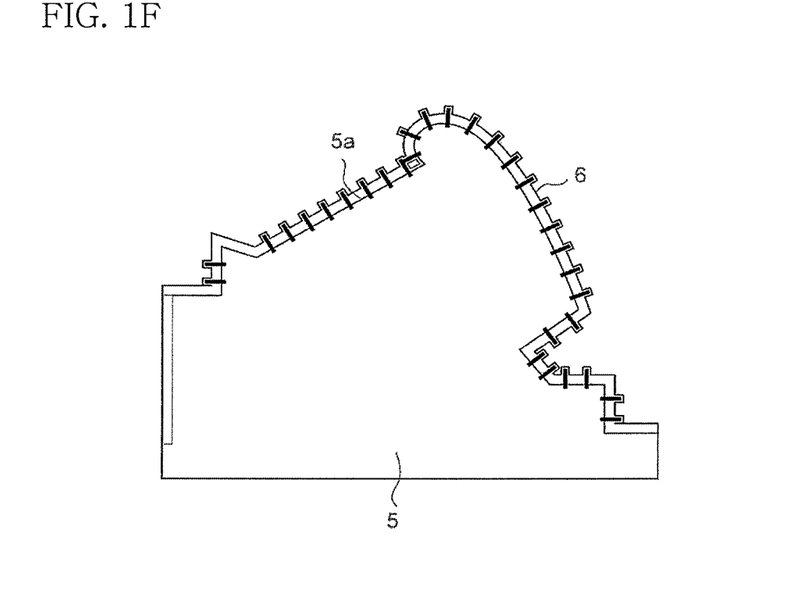
Figure 2:
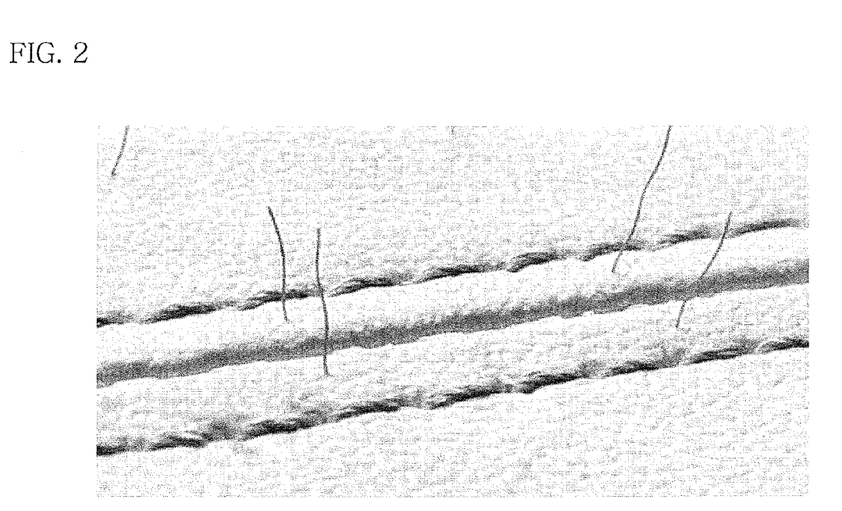
FIG. 2 is a photograph showing an epoxy mandrel conductive-treated together with the implanted fiber according to the present invention.

FIG. 1f shows a step of conductive-treating a patterned surface of an epoxy mandrel, into which the plurality of fibers is implanted. In this step, a conductive thin film 6 is formed on the patterned surface 5a of the epoxy mandrel 5. Here, the fiber 4b, which is transferred to the epoxy mandrel 5, is conductive-treated together. FIG. 2 is a photograph showing an epoxy mandrel 5 conductive-treated together with the implanted fiber according to the present invention.

Figure 1G:
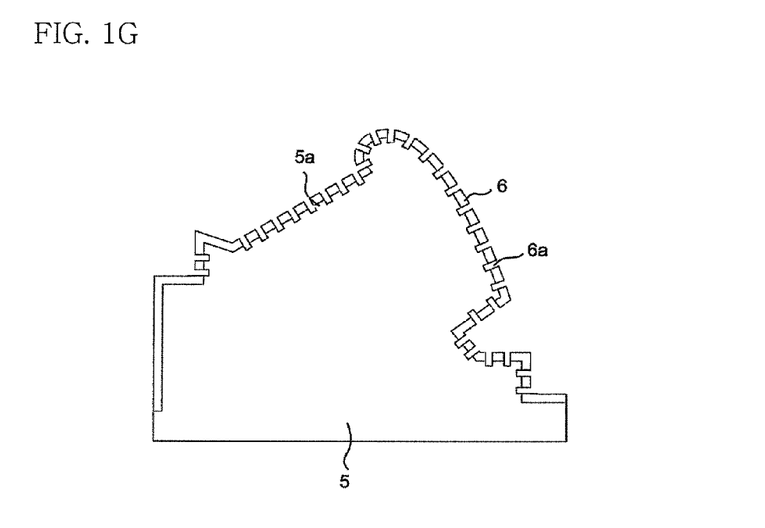
Figure 3:
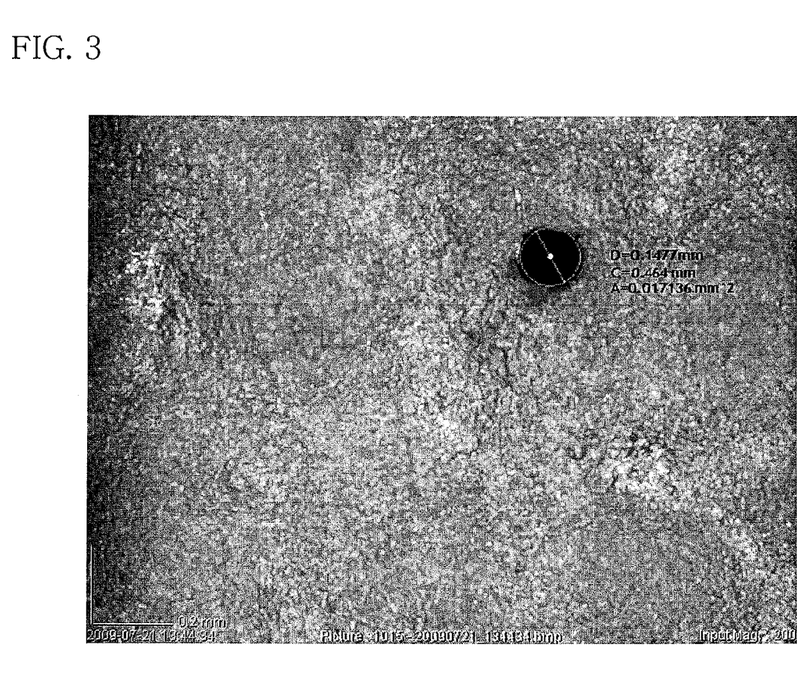
FIG. 3 is an enlarged photograph showing a hole generated from a removal of a fiber on an epoxy mandrel according to the present invention.

FIG. 1g shows a step of removing a fiber 4b from an epoxy mandrel 5. Accordingly, a plurality of holes 6a are formed on the conductive film 6 according to the removal of the fibers 4b. Here, the method of removing the fiber is not limited. However, it is preferred that the fibers are pulled out from the epoxy mandrel. FIG. 3 is an enlarged photograph showing a hole generated from a removal of a fiber on an epoxy mandrel 5 according to the present invention.

Since the shape and size of the hole 6a is determined according to those of the used fiber 4b, the shapes of the holes 6a can be determined by using other fibers in terms of a sectional shape or a diameter. The size of the fiber 4b in diameter may be optional according to the purpose thereof. Generally, it is 0.05 mm-0.30 mm. More preferably, it is 0.10 mm-0.15 mm. Accordingly, the size of the generated hole 6a can be determined within the range.

Herein, the portion of the conductive thin film 6 is electrodeposited with an electroforming metal during electroforming, and the portion of the non-conductive hole 6a is not electrodeposited with an electroforming metal.

Figure 1H:
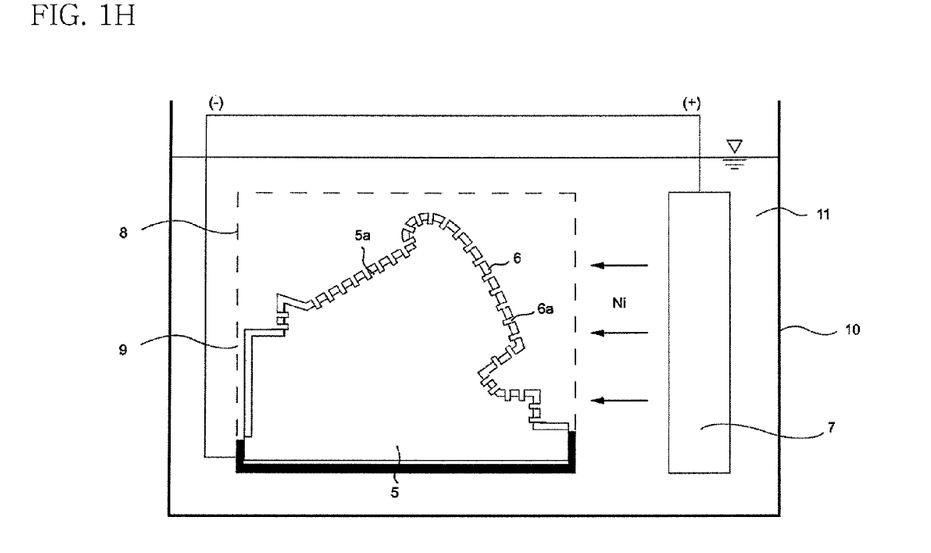

Then, FIG. 1h shows an electroforming step. As shown, the conductive thin film 6 of the epoxy mandrel 5, which has been subjected to conducting and non-conducting processes, and has a masked lateral surface and a masked undersurface, is connected to a negative terminal of an electrical device, and a metallic electrode 7 is connected to a positive terminal. They are taken in an electroforming cell 10 containing an electroforming liquid 11, and then electroforming (electrodepositing) plating is carried out by application of DC. Then, metal ions are moved through the electroforming liquid 11, and are electrodeposited on the conductive thin film 6 on the epoxy mandrel 5 having conductivity so as to form a metal electrodeposited layer 20 (see FIG. 1i).

In general, as the metallic electrode 7 that may be used for electroforming, Ni is most widely used. However, the metallic electrode 7 may be made of copper, brass, or the like. Also, although only one metallic electrode 7 at the right side is shown in the example, it is possible to provide a plurality of metallic electrodes at both left and right sides, or at front, rear, left, and right sides.

The electroforming liquid 11 may include conventional nickel sulfamate and boric acid as main components, and as required, may further include nickel chloride, or sodium lauryl sulfate as a surfactant.

The electroforming is preferably carried out under relaxed conditions other than general conditions (that is 1-10 A/dm$^2$) to form fine pores, because such relaxed conditions are advantageous in the control of the growth of bubbles, and the prevention of the detachment of bubbles. Specifically, nickel is precipitated from the surface of the conductive thin film 6 while an excess electric field is generated in an interface with the non-conductive holes 6a, thereby generating a large amount of fine hydrogen gas bubbles. As the bubbles are entrained, the bubbles become larger and grow to some extent. Then, according to the progress of electroforming, a fine through pore (see reference numeral 21 in FIG. 1i) having a diameter increasing toward the outside is formed by the shape of a bubble.

Accordingly, under the relaxed conditions according to the manufacturing method of the present invention, for example, initially it is electrodeposited in a current from 0.5 to 0.8 A/dm$^2$ for 2-5 hours and then, it increases in a current from 0.05 to 0.2 A/dm$^2$ per 10 minutes to reach 1.2 to 2.5 A/dm$^2$.

Then, it is continuously electrodeposited for 5-10 days, or preferably it continuously maintains 1.2 to 2.5 A/dm² from the beginning. However, such conditions are not unconditional, but selective. Thus, they are appropriately selected and determined according to a change in various conditions such as three dimensional shape properties and thickness of an electroformed shell, pattern properties, physicochemical properties of a molding resin constituting an injection molded product or its surface skin material, or the like.

Also, according to the manufacturing method of the present invention, a blocking wall 8 having multiple pores 9, made of a non-electrodepositable rigid resin (such as a condensation resin of phenol and formaldehyde, e.g., Bakelite (trade name)), is preferably placed in a box form at the upper part and the front/rear/left/right side parts of the epoxy mandrel 5 to be electrodeposited, so as to prevent bubbles from detaching by the flow velocity of the electroforming liquid. This helps satisfactory generation and growth of the above described fine through pores.

The height of the blocking wall 8 is preferably greater than the uppermost height of the epoxy mandrel 5 by 20~30 mm. Also, the pore 9 formed in the blocking wall 8 has diameters increasing from the center to the outside in such a manner that a uniform thickness of an electroformed shell can be secured through uniform electrodeposition.

Figure 1I:
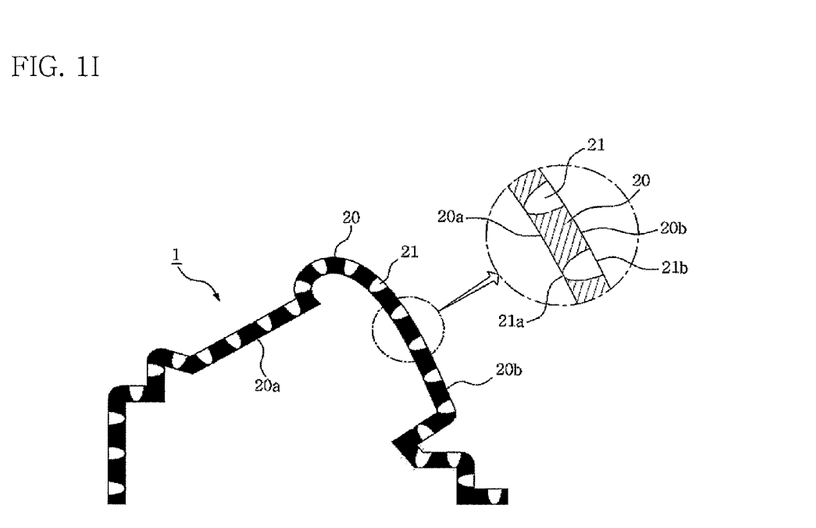

Then, FIG. 1i shows a mimetic cross-sectional view of the porous electroformed shell 1 for forming a negative-type pattern, demolded from the epoxy mandrel 5. From the drawing, it can be seen that the porous electroformed shell for patterning including an electrodeposited layer 20 electrodeposited, in the above described electroforming step, on the conductive thin film 6 of the epoxy mandrel 5, has multiple fine pores 21 formed therein.

The electrodeposited layer 20 has a front surface (that is, an internal surface) 20a as a patterned surface, and a rear surface (that is, an external surface) 20b, and has the fine pores 21 derived from the above mentioned nonconductive holes 6a.

The fine pore 21 is formed by an electroforming metal not electrodeposited to a bubble area, as hydrogen bubbles are generated, attached, grown, and developed, on the nonconductive holes 6a during electroforming. Thus, it takes a cup shape having a front-side opening 21a with a very small diameter, and a rear-side opening 21b with a relatively very large diameter.

Such a shape is important, because it allows air venting or suction to effectively occur during preforming of a molded product or a decorative skin material, and also prevents foreign substances, such as a injection molding material from blocking the fine pore 21.

The size of the fine pore, that is the size of the front-side opening 21a of the fine pore 21 generated during manufacturing of the porous electroformed shell according to the present invention can be determined according to the size of the fiber in diameter (the size of the nonconductive hole). In the manufacturing method according to the present invention, at least 95% of the fine pores have front-side opening diameters within a range of ±0.02 mm error in comparison with hole diameters formed by the fiber in order to easily control the size of the fine pore 21.

The fine pores 21 are spaced apart from each other, and may be formed in such a manner that the density of the fine pores 21 (that is, the number of the fine pores per unit area) can be wholly uniform or locally non-uniform. Also, the diameter of the fine pores 21 may be locally different according to the morphological features of the electroformed shell 1 for patterning.

Meanwhile, the thickness of the electrodeposited layer 20 constituting the electroformed shell 1 for patterning is generally within a range of 0.15 mm to 15 mm, but may be appropriately determined within a larger range according to various parameters, such as three dimensional shape and pattern properties, physical properties required for the utilization of an electroformed shell, physicochemical properties of a molding resin constituting an injection molded product or its surface skin material, a molding temperature, or the like.

In amplification, although not shown, the conductive thin film 6 exists in a front surface (internal surface) of the porous electroformed shell 1 demolded from the epoxy mandrel 5. Thus, for example, the conductive thin film 6, such as a silver mirror film, is removed by using a mixed liquid of hydrogen peroxide and ammonia, and the masking pattern 7a is subjected to combustion removal or solvent removal. Then, gloss control is carried out. As required, cleaning on a rear surface (external surface) of the porous electroformed shell 1, cutting of a residue portion, grinding, gloss treatment, sand blast, and the like may be appropriately carried out.

When the porous electroformed shell 1 for patterning is made of nickel, the characteristics are specifically described below:

thickness: equal to or less than 4 mm (selective), density: $8.9/cm^3$, melting point: 1450° C., thermal expansion coefficient (X 10/° C.): 13.3, specific heat (kcal/g° C.): 0.11, thermal conductivity (cal/cm.sec. ° C.): 0.22, hardness (HRC): 25: 25, roughness: ±0.5 μm, grain depth: 80~140 μm.

In the manufacturing method according to the present invention, as described above, when the nonconductive hole 6a to be generated and grown as the fine pore 21 is formed on the conductive thin film 6, the fiber 4b having the predetermined diameter and shape is used. Thus, it is possible to simply, economically, and efficiently carry out precise control, both as a whole or in part, on the diameter, formation position, and density of the fine pores to be formed in the three dimensional-shaped porous electroformed shell 1 according to various curved shapes of the porous electroformed shell 1, and also, the diameter, formation position, and density of the fine pores can show high reliability and constancy without a difference in the proficiency of an operator and other variables. In other words, through the porous electroformed shell 1 obtained by the manufacturing method of the present invention, it is possible to effectively provide a highly-refined, sharp, and precise texture to the external surface of a surface skin material or a plastic molded product, to be applied to one-piece molding of a high-quality surface skin material.

Hereinafter, the present invention will be described in more detail with reference to Examples. However, the Examples are illustrative only, and are not intended to limit the present invention.

EXAMPLE

Manufacture of a Porous Nickel Electroformed Test Piece

In order to manufacture a molded product having a grain patterned surface, 5 epoxy plate-type test pieces having the grain pattern as shown in FIG. 2 were prepared. Each test piece was manufactured with a size of 100 mm×100 mm×25 mm (thickness), and a porous nickel electroformed shell for patterning was manufactured in accordance with the process as illustrated in FIG. 1 as described below.

Examples 1 to 3

Manufacture of a Porous Nickel Electroformed Test Piece

A negative-type silicone cast was manufactured by using the epoxy plate. Two carbon fibers and one wire, which are 0.20 mm, 0.25 mm, and 0.12 in diameter respectively, are implanted into a patterned surface of the negative-type silicone cast in such a manner that the length of the fiber exposed from the outside of the patterned surface of the negative-type silicone cast is 3 mm and then, an epoxy resin is applied and laminated on the patterned surface of the negative-type silicone cast to be cured. Here, the exposed part of the fiber is transferred from the silicone cast to the epoxy mandrel by curing the epoxy resin during demolding of the epoxy mandrel.

Continuously, as shown in FIG. 2, the grain patterned surface on the epoxy mandrel, into which the fiber is implanted, became conductive through a silver mirror reaction. Here, the fiber also, became conductive through the silver mirror reaction together.

After the silver mirror reaction, the fiber was removed from the epoxy mandrel by using tweezers. FIG. 3 is an enlarged photograph of 200× magnifications showing a hole generated from a removal of a conductive-treated fiber on a grain patterned surface of an epoxy mandrel 5 according to the present invention. After the removal of the fiber, a box-shaped Bakelite blocking wall having multiple pores formed therein (see reference numeral 10 in FIG. 1h) was provided at the upper side and the front/rear/left/right sides with a height of 25 mm upwardly from the upper surface of the test piece in order to reduce flow velocity on the electroformed surface. Then, in an electroforming cell, nickel electroforming was carried out as shown in the following table 1.

In the electroforming, a current was continuously 1.0 $A/dm^2$ at the initial stage.

The electroforming liquid contains nickel sulfamate acid of 450~500 g/l, and boric acid of 20~35 g/l, and has pH 3.5~4.5.

TABLE 1

| | Fiber diameter (mm) | electroforming time | temperature |
|---|---|---|---|
| Example 1 | Φ0.20 | 96 hr | 30~32° C. |
| Example 2 | Φ0.25 | 240 hr | |
| Example 3 | Φ0.12 | 240 hr | |

Figure 4A:
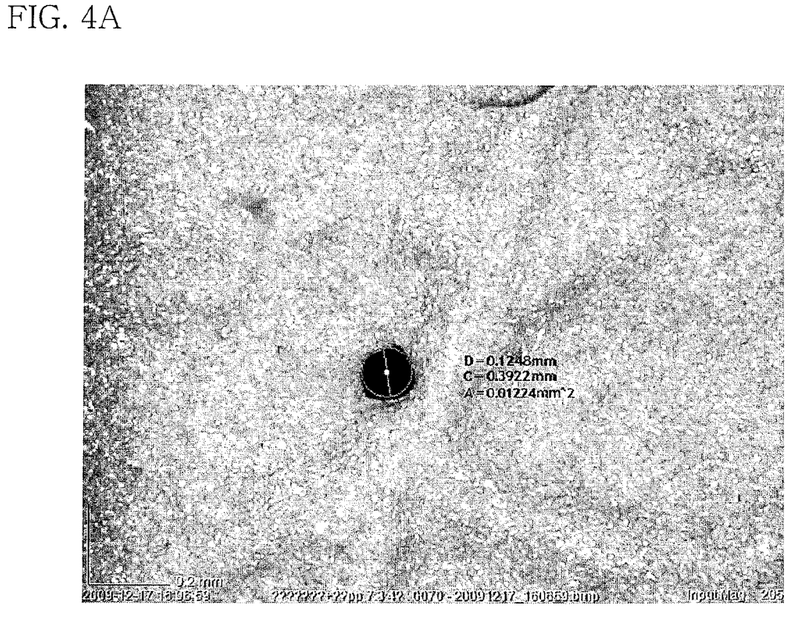
FIGS. 4a to 4b are enlarged photographs showing a front-side opening, and a rear-side opening of a fine pore formed in a patterning porous electroformed shell manufactured according to the present invention, in which the front-side opening and the rear-side opening correspond to a fine pore opening on a grain patterned surface, and another fine pore opening on a rear surface of the grain patterned surface, respectively.
Figure 4B:
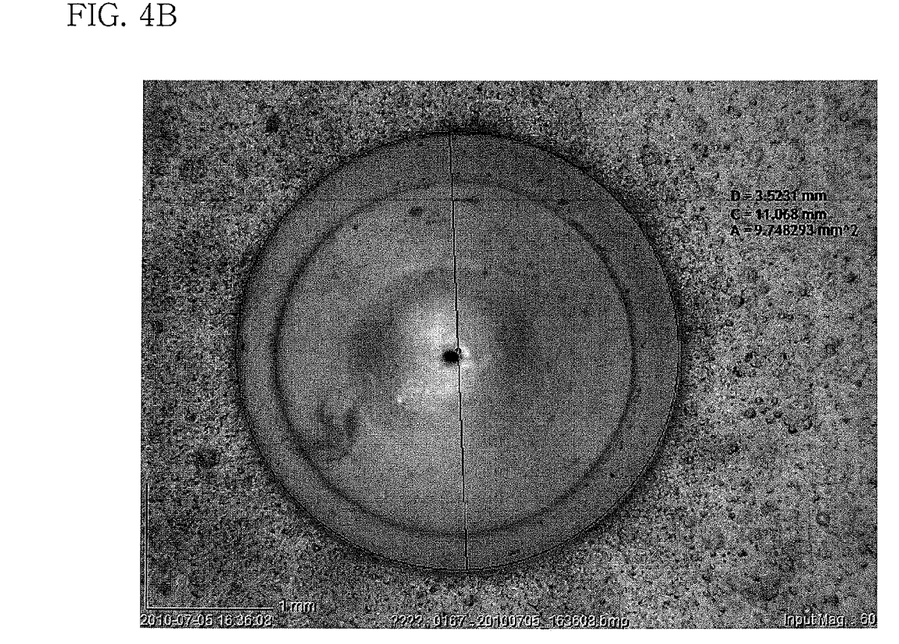

Then, an electrodeposited layer having the fine pore is demolded from the epoxy mandrel to manufacture a porous electroformed shell. FIGS. 4a and 4b are ×200 enlarged photographs showing the front-side opening (see reference numeral 21a in FIG. 1i), and the rear-side opening (see reference numeral 21b in FIG. 1i) of the fine pores (see reference numeral 21 in FIG. 1i), respectively, in which the fine pores are formed on the grain patterned surface 20 of the porous electroformed shell for patterning, obtained by the manufacturing method of the present invention.

Comparative Example 1

Manufacture of a Porous Nickel Electroformed Test Piece

A negative-type silicone cast was manufactured by using the epoxy plate. a carbon fiber having 0.20 mm in diameter is implanted into a patterned surface of the negative-type silicone cast in such a manner that the length of the fiber exposed from the outside of the patterned surface of the negative-type silicone cast is 3 mm and then, an epoxy resin is applied and laminated on the patterned surface of the negative-type silicone cast to be cured. Here, the exposed part of the fiber is transferred from the silicone cast to the epoxy mandrel by curing the epoxy resin during demolding of the epoxy mandrel.

Continuously, as shown in FIG. 2, the grain patterned surface on the epoxy mandrel, into which the fiber is implanted, became conductive through a silver mirror reaction. Here, the fiber also, became conductive through the silver mirror reaction together. Differently with the above mentioned examples, in a condition that the fiber is not removed, a nickel electroforming was carried out as shown in the following table 2. Then, an electrodeposited layer having the fine pore is demolded from the epoxy mandrel to manufacture a porous electroformed shell The condition of a plating solution is as follows.

The electroforming liquid contains sulfamic acid of 450~500 g/l, and anything else is the same as the above mentioned examples.

TABLE 2

| | Fiber diameter (mm) | electroforming time | temperature |
|---|---|---|---|
| Comparative Example 1 | Φ0.20 | 6 hr | 30~32° C. |

Comparative Examples 2 and 3

Manufacture of a Porous Nickel Electroformed Test Piece

Electroforming was carried out with a fixed current of 1.0 $A/dm^2$. In order to compare with the porous nickel electroformed test piece by removing the fiber as describe above in the examples, after the silver mirror reaction, a drill process was carried out as shown in the following table 3. Other conditions were the same as those of the above mentioned examples.

TABLE 3

| | Fiber diameter (mm) | electroforming time | temperature |
|---|---|---|---|
| Comparative Example 2 | Φ0.30 | 24 hr | 30~32° C. |
| Comparative Example 3 | Φ0.30 | 91 hr | |

Test Example 1

Test on a Front-Side Opening Diameter and a Rear-Side Opening Diameter of a Fine Pore in a Test Piece For a fine pore formed in each of the porous nickel electroformed test pieces obtained from Examples 1 to 3 and Comparative Examples 1 to 3, the front-side (grain patterned) opening diameter and the formation ratio of fine pores were measured, respectively. The results are noted in Tables 4.

TABLE 4

| Example | hole diameter (mm) | formation ratio of fine pores | front-side opening diameter (mm) |
|---|---|---|---|
| Example 1 | Φ0.20 | 100% | 0.18~0.22 |
| Example 1 | Φ0.25 | 100% | 0.23~0.27 |
| Example 3 | Φ0.12 | 100% | 0.11~0.14 |
| Comparative Example 1 | Φ0.25 | — | No measurement |
| Comparative Example 2 | Φ0.30 | 100% | 0.29~0.33 |
| Comparative Example 3 | Φ0.30 | 98% | 0.08~0.30 |

As noted in Table 4, as a result of the test on the front-side opening diameter of fine pores in the porous nickel electroformed test pieces obtained from Examples 1 to 3, it can be seen that when the front-side opening diameters is within a range of ±0.02 mm error of the hole diameters formed by the removal of the fiber, the most preferable opening diameter was be obtained.

Figure 6:
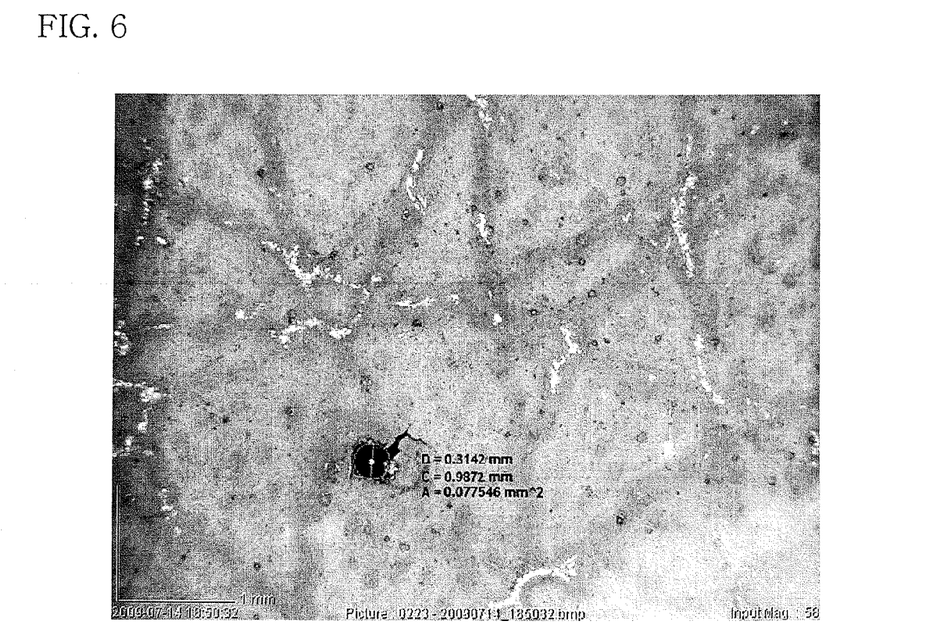
FIG. 6 is an enlarged photograph showing front-side openings of fine pores by means of a removal of a fiber after electroforming in a patterning porous electroformed shell according to Comparative Example 1.

Meanwhile, in case of the test pieces obtained from Comparative Example 1, in a condition that the fiber is not removed, a nickel electroforming was carried out for 6 hours. Here, it can be seen from FIG. 6 that the nickel shell around the fiber is deviated from the epoxy mandrel and is torn off during removal of the fiber, because the electroforming is carried out together with the fiber.

Figure 7:
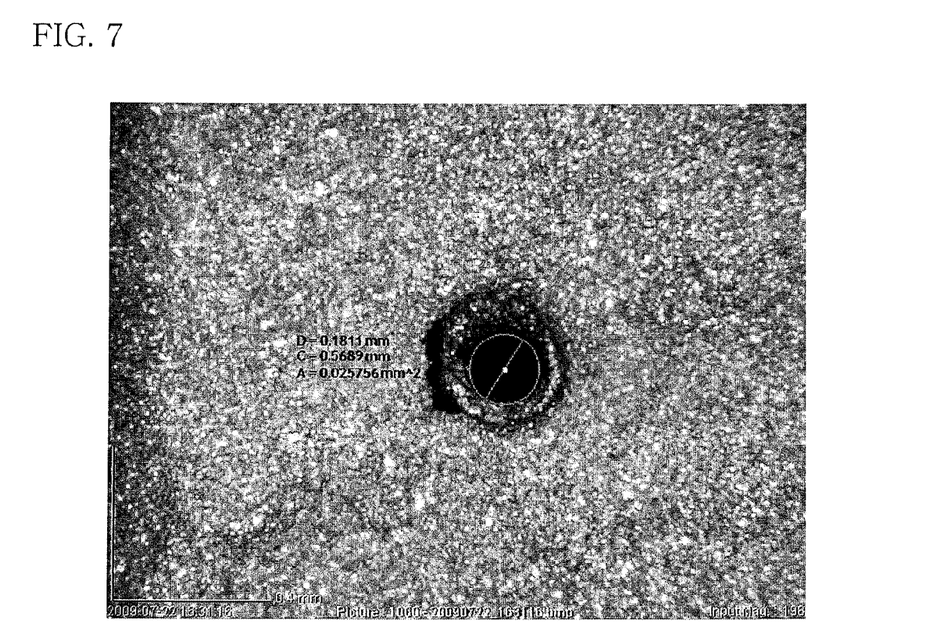
FIG. 7 is an enlarged photograph showing a front-side opening of fine pores formed in a patterning porous electroformed shell manufactured according to Comparative Example 3.
Figure 8:
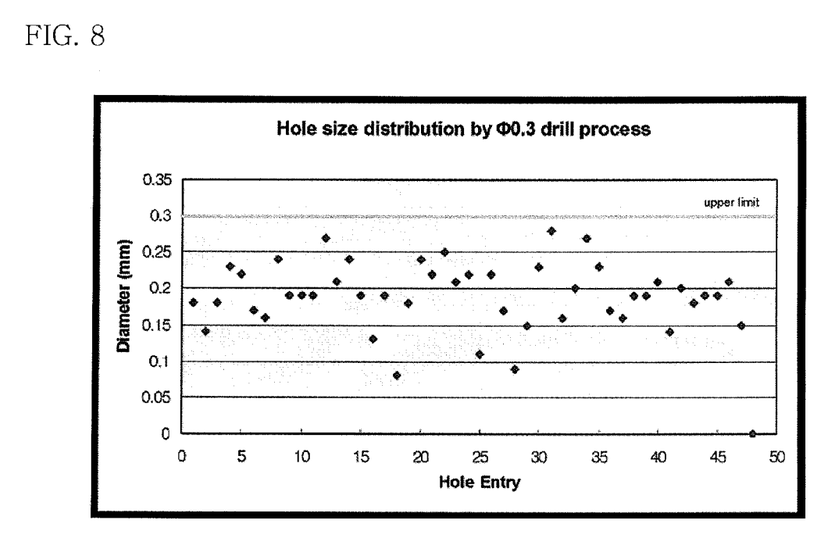
FIG. 8 is a view illustrating a distribution of front-side opening diameters of fine pores formed in a patterning porous electroformed shell manufactured according to Comparative Example 3.

In case of Comparative Examples in which holes is formed by a drill process, there is no big problem in forming of a fine pore until 24 hours at the initial stage in Comparative Example 2. However, in Comparative Example 3, since the electroforming thickness is more than 2 mm due to the nature of the electroforming, it is electroformed inside the front-side opening owing to a burr, so that the diameter of the fine pore becomes smaller as time goes on as shown in FIG. 8. FIG. 7 is a photograph showing a front-side opening of a fine pore of Comparative Example 3. As shown in FIG. 7, it can be seen that there is a difference in a shape thereof in comparison with FIG. 4*a*.

Test Example 2

Diameter Distribution on a Fine Pore

Figure 5:
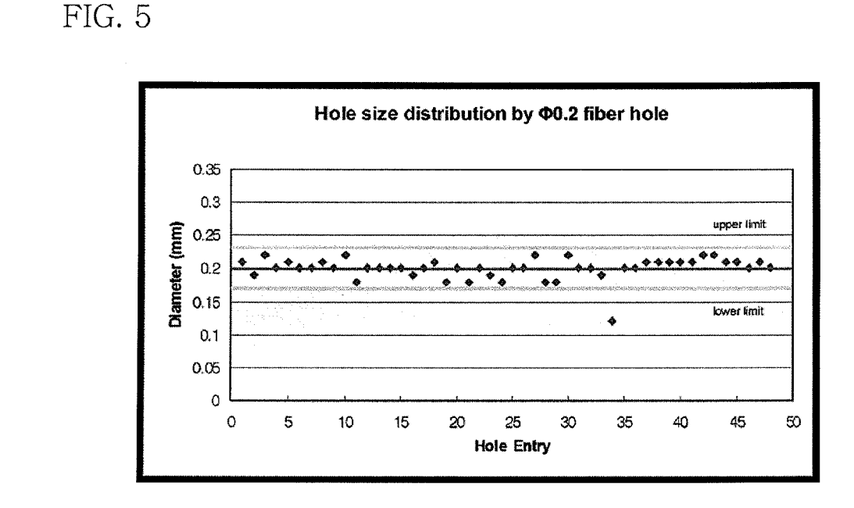
FIG. 5 is a view illustrating a distribution of front-side opening diameters of fine pores formed in a patterning porous electroformed shell manufactured according to Example 1 of the present invention.

For a fine pore formed in each of the porous nickel electroformed test pieces obtained from Example 1 and Comparative Example 3, the diameter distribution thereof is examined. 48 fine pores are selected at random and then, it examines the diameters thereof. The results are noted in FIG. 5 and FIG. 8. In the diameter distribution on the fine pore formed through the hole using the fiber of 0.2 mm in diameter, as shown in FIG. 5, the average of the diameter is 0.2 mm and the standard deviation thereof is 0.016. Accordingly, it can be seen that most of the fine pores are distributed within a range of ±0.02 mm error of the hole diameters formed by the fiber. As shown in FIG. 5, 47 fine pores among 48 fine pores are existed within a target range of a maximum value 0.22 and a minimum value 0.18 in terms of the diameter distribution on the fine pore. Accordingly, it can be seen that at least 97.9% of the fine pores can be set up within the target value.

However, as shown in FIG. 8, in the diameter distribution on the fine pore formed through the drill processing hole of 0.3 mm in diameter, the average of the diameter is 0.187 mm and the standard deviation thereof is 0.051. Accordingly, it can be seen that the standard deviation among the hole diameters becomes larger. In comparison with FIG. 5, there is a difference in the standard deviation thereof. Also, since the hole diameter becomes smaller owing to the burr, it is showed that an additional process for removing the burr of the fine pore of the nickel shell is demanded.

Therefore, according to the manufacturing method of the present invention, it is possible to simply and easily achieve the precise control on the diameter and the distribution of fine pores.

Although the present invention has been described with reference to Examples and Test Examples, those skilled in the art will appreciate that various modifications, additions and substitutions are possible, without departing from the scope and spirit of the invention as disclosed in the accompanying claims.

What is claimed is:

1. A method for manufacturing a porous electroformed shell for patterning, comprising the steps of:
providing a low hardness negative-type silicone cast having a patterned surface;
implanting at least one fiber directly into said patterned surface of said negative-type silicone cast, said at least one fiber being of sufficient hardness to permit said implanting step to be performed without pre-forming holes in said negative-type silicone cast prior to said implanting step;
manufacturing an epoxy mandrel by applying, laminating, and curing an epoxy resin on said patterned surface of said negative-type silicone cast, and transferring said at least one fiber from said negative-type silicone cast to said epoxy mandrel when separating said epoxy mandrel from said negative-type silicone cast, to form a patterned surface on said epoxy mandrel;
forming a conductive thin film on said patterned surface of said epoxy mandrel, and causing said patterned surface of said epoxy mandrel to be conductive;
removing said at least one fiber from said epoxy mandrel having said conductive thin film, prior to electroforming, leaving a plurality of openings defined by said epoxy mandrel and said conductive thin film where said at least one fiber was implanted;
electroforming a metal on said conductive thin film to create an electroformed layer while generating and growing a fine pore in said plurality of openings defined by said epoxy mandrel and said conductive thin film; and
separating said electroformed layer having said fine pore from said epoxy mandrel.

2. The method as claimed in claim 1, wherein:
an entire length of said at least one fiber implanted into said patterned surface of said negative-type silicone cast is 5-15 mm.

3. The method as claimed in claim 1, wherein:
said at least one fiber, which is transferred from said negative-type silicone cast to said epoxy mandrel, is implanted into said epoxy mandrel to the depth of 2-4 mm.

4. The method as claimed in claim 1, wherein:
a diameter of said at least one fiber is 0.05 mm-0.30 mm.

5. The method as claimed in claim 1, wherein:
said electroformed layer is made of a member selected from the group consisting of nickel, copper, and brass.

6. The method as claimed in claim 1, wherein:
a release treatment step is carried out before said at least one fiber is implanted into said patterned surface of said negative-type silicone cast.

7. The method as claimed in claim 1, wherein:
in said electroforming step, said electroforming continuously maintains 1.2 to 2.5 A/dm$^2$ for 5-10 days.

8. The method according to claim 1, wherein:
a plurality of fibers are implanted into said patterned surface of said negative-type silicone cast.

* * * * *